(12) United States Patent
Xing et al.

(10) Patent No.: US 11,768,097 B2
(45) Date of Patent: Sep. 26, 2023

(54) LIQUID EXTRACTION CONTROL METHOD AND DEVICE

(71) Applicant: BEIJING XIAOMI MOBILE SOFTWARE CO., LTD., Beijing (CN)

(72) Inventors: Zheng Xing, Beijing (CN); Yingchun Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 455 days.

(21) Appl. No.: 16/926,953

(22) Filed: Jul. 13, 2020

(65) Prior Publication Data

US 2021/0148745 A1    May 20, 2021

(30) Foreign Application Priority Data

Nov. 14, 2019 (CN) .......................... 201911114997.2

(51) Int. Cl.
*G01F 15/02* (2006.01)
*G01N 1/28* (2006.01)
*G01N 1/40* (2006.01)

(52) U.S. Cl.
CPC ............. *G01F 15/022* (2013.01); *G01N 1/28* (2013.01); *G01N 2001/4061* (2013.01)

(58) Field of Classification Search
CPC .............................. G01K 13/02; A47G 21/182
See application file for complete search history.

(56) References Cited

U.S. PATENT DOCUMENTS

| 7,766,545 B2 * | 8/2010 | Salkeld ............. A47G 19/2272 374/163 |
| 9,980,590 B1 * | 5/2018 | Broadway .............. A47G 23/10 |
| 2006/0283856 A1 * | 12/2006 | Spinelli ................. A61J 11/002 229/404 |

(Continued)

FOREIGN PATENT DOCUMENTS

| CN | 109757948 A | 5/2019 | |
| CN | 209404297 U | 9/2019 | |
| WO | WO-2017075298 A1 * | 5/2017 | ......... A47G 19/2227 |

OTHER PUBLICATIONS

English machine translation of Fujimoto (JP 2004184252 A), "Flow Rate Measuring Apparatus and Operation Control Method Therefor", pp. 9 and 45 (Year: 2004).*

(Continued)

*Primary Examiner* — David Z Huang
(74) *Attorney, Agent, or Firm* — SYNCODA LLC; Feng Ma

(57) ABSTRACT

A liquid extraction control method includes: acquiring a current temperature value of liquid to be extracted; determining whether the current temperature value is within a predetermined temperature value range; opening a liquid flow channel when the current temperature value is within the predetermined temperature range, and closing the liquid flow channel when the current temperature value is outside the predetermined temperature range. The temperature range of the liquid to be extracted can therefore be controlled, reducing probability of injuries caused by overly hot or cold liquid through a straw, and facilitating control of the temperature and extraction amount suitable for users, so as to achieve smart and quantitative fluid extraction.

13 Claims, 6 Drawing Sheets

(56) References Cited

U.S. PATENT DOCUMENTS

2008/0023567 A1* 1/2008 Byerly .................. A47G 21/18
137/533.11

OTHER PUBLICATIONS

English machine translation of Hong (CN 210661624 U), "The Locator Device for Visually Displaying the State of the Valve", pp. 2 and 3 (Year: 2019).*
Extended European Search Report in Application No. 20187515.0, dated Feb. 8, 2021.
European Patent Office in Application No. 20187515.0, dated Feb. 10, 2023.

* cited by examiner

LIQUID EXTRACTION CONTROL METHOD AND DEVICE

CROSS-REFERENCE TO RELATED APPLICATIONS

This application claims priority to Chinese Patent Application No. 201911114997.2 filed on Nov. 14, 2019, the disclosure of which is hereby incorporated by reference in its entirety.

BACKGROUND

Many users often use straws to sip liquids such as beverages, porridge, soup, etc. Using the straws can prevent the liquids from spilling out of the containers; and can also avoid some problems associated with directly employing gravity for liquid ingestion, particularly helpful for users with reduced mobility.

SUMMARY

The present disclosure generally relates to the field of smart control, and more specifically to a liquid extraction control method and an extraction control device.

According to a first aspect of embodiments of the present disclosure, there is provided a liquid extraction control method, including: acquiring a current temperature value of liquid to be extracted; determining whether the current temperature value is within a predetermined temperature value range; opening a liquid flow channel when the current temperature value is within the predetermined temperature range; and closing the liquid flow channel when the current temperature value is outside the predetermined temperature range.

In some embodiments, before determining whether the current temperature value is within a predetermined temperature value range, the liquid extraction control method of the embodiment of the present disclosure further includes: receiving temperature data information representing the predetermined temperature range via a wireless network; and storing the temperature data information.

In some embodiments, the liquid extraction control method of the embodiment of the present disclosure further includes: acquiring an accumulative flow value of liquid in a predetermined state, wherein the predetermined state is a movement state of the liquid from a start of movement to an end of movement of the liquid along a predetermined direction of the liquid flow channel; summing up all the accumulative flow values from a first moment within a predetermined period to determine a real-time accumulative flow value of liquid; comparing the real-time accumulative flow value of the liquid with a total liquid flow value that is set within the predetermined period, wherein a start moment of the predetermined period is the first moment; opening the liquid flow channel when the real-time accumulative flow value of the liquid is less than the total liquid flow value; and closing the liquid flow channel when the real-time accumulative flow value of the liquid is greater than or equal to the total liquid flow value.

In some embodiments, before comparing the real-time accumulative flow value of the liquid with a total liquid flow value that is set within the predetermined period, the liquid extraction control method of the embodiment of the present disclosure further includes: receiving total flow data information representing the total flow value of the liquid; and storing the total flow data information.

In some embodiments, the liquid extraction control method of the embodiment of the present disclosure further includes: sending, to a smart terminal, the accumulative flow value, or the real-time accumulative flow value of the liquid, or a combination of the accumulative flow value and the real-time accumulative flow value of the liquid.

In some embodiments, the liquid extraction control method of the embodiment of the present disclosure further includes: displaying the accumulative flow value, or the real-time accumulative flow value of the liquid, or a combination of the accumulative flow value and the real-time accumulative flow value of the liquid.

According to a second aspect of embodiments of the present disclosure, there is provided a liquid extraction control device, including: a first acquiring component configured to acquire a current temperature of liquid in real time; a determining component electrically coupled to the first acquiring component, and configured to determine whether the current temperature value is within a predetermined temperature value range; and a liquid flow channel control component electrically coupled to the determining component, and configured to open a liquid flow channel when the current temperature value is within the predetermined temperature range and to close the liquid flow channel when the current temperature value is outside the predetermined temperature range.

In some embodiments, the liquid extraction control device of the embodiment of the present disclosure further includes: a smart terminal configured to send temperature data information representing the predetermined temperature range via a wireless network; and a wireless communication component configured to receive and store the temperature data information representing the predetermined temperature range via a wireless network.

In some embodiments, the liquid extraction control device of the embodiment of the present disclosure further includes: a second acquiring component electrically coupled to the determining component, and configured to acquire an accumulative flow value of the liquid in a predetermined state, and to sum up all the accumulative flow values from a first moment within a predetermined period to determine a real-time accumulative flow value of the liquid, wherein the predetermined state is a movement state of the liquid from a start of movement to an end of movement of the liquid along a predetermined direction of the liquid flow channel; the determining component being further configured to compare the real-time accumulative flow value of the liquid with a total liquid flow value that is set within the predetermined period, wherein a start moment of the predetermined period is the first moment; and the liquid flow channel control component being further configured to open the liquid flow channel when the real-time accumulative flow value of the liquid is less than the total liquid flow value and to close the liquid flow channel when the real-time accumulative flow value of the liquid is greater than or equal to the total liquid flow value.

In some embodiments, in the liquid extraction control device of the embodiment of the present disclosure, the wireless communication component is further configured to receive and store total flow data information representing the total flow value of the liquid.

In some embodiments, in the liquid extraction control device of the embodiment of the present disclosure, the wireless communication component is further configured to send the accumulative flow value, or the real-time accumulative flow value of the liquid, or a combination of the accumulative flow value and the real-time accumulative flow value of the liquid.

In some embodiments, the liquid extraction control device of the embodiment of the present disclosure further includes: a displaying component connected to the wireless communication component via a wireless network, and configured to display the accumulative flow value, or the real-time accumulative flow value of the liquid, or a combination of the accumulative flow value and the real-time accumulative flow value of the liquid; and an adjusting component connected to the wireless communication component via a wireless network, electrically coupled to the displaying component, and configured to adjust the predetermined temperature range, or the total flow value of the liquid, or a combination of the predetermined temperature range and the total flow value of the liquid.

In some embodiments, the liquid extraction control device of the embodiment of the present disclosure further includes: a straw connected to one end of the liquid flow channel that is close to the liquid flow channel control component.

According to a third aspect of embodiments of the present disclosure, there is provided an liquid extraction control device, including: a housing including a liquid flow channel as well as a first end and a second end which are connected through the liquid flow channel, wherein the first end is connected to a straw; a temperature sensor mounted at the second end, and configured to measure a temperature of liquid passing through the liquid flow channel; a flow control valve disposed within the liquid flow channel; and a processor electrically coupled to the temperature sensor and the flow control valve, and configured to control opening and closing of the flow control valve based on the temperature measured by the temperature sensor.

In some embodiments, the liquid extraction control device of the embodiment of the present disclosure further includes: a flow meter disposed within the liquid flow channel, electrically coupled to the processor, and configured to measure a total amount of the liquid flowing through the liquid flow channel within a predetermined time range or in a predetermined state; and the processor being configured to control the opening and closing of the flow control valve based on the total amount of liquid measured by the flow meter.

In some embodiments, the liquid extraction control device of the embodiment of the present disclosure further includes: a wireless communication module disposed on the housing, electrically coupled to the processor, and being in wireless communication with a smart terminal; and the processor being configured to receive a control instruction of the smart terminal through the wireless communication module.

In some embodiments, the liquid extraction control device of the embodiment of the present disclosure further includes a display screen electrically coupled to the processor to display an opening and closing state of the flow control valve.

In some embodiments, the liquid extraction control device of the embodiment of the present disclosure further includes: a battery mounted on the housing, and electrically coupled to the temperature sensor, the flow control valve, and the processor.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the disclosure, illustrate embodiments consistent with the present disclosure and, together with the description, serve to explain the principles of the present disclosure.

DETAILED DESCRIPTION

Figure 1:
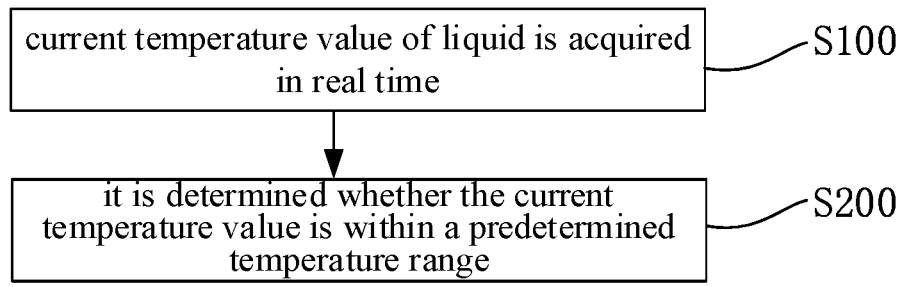
FIG. 1 is a schematic flowchart of a liquid extraction control method according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The principle and spirit of various embodiments the present disclosure will be described below with reference to several exemplary embodiments. It should be understood that these embodiments are given only to enable those skilled in the art to better understand and thereby implement the present disclosure, not to limit the scope of the present disclosure in any way.

It should be noted that although the expressions such as "first" and "second" are used herein to describe the different modules, steps, data, etc. of the embodiments of the present disclosure, the expressions such as "first" and "second" are only for the purpose of distinguishing between different modules, steps, data, etc., and do not indicate a specific order or priority. In fact, the expressions such as "first" and "second" can be used interchangeably.

In order to better understand the liquid extraction control device according to various embodiments the present disclosure, preferred embodiments of the liquid extraction control device of the present disclosure will be further described below with reference to the accompanying drawings. The orientation or positional relationship indicated by the terms "center," "longitudinal," "horizontal," "front," "rear," "left," "right," "vertical," "horizontal," "top," "bottom," "inner," "outer," etc. is based on the orientation or positional relationship shown in the drawings, and is only for the convenience of describing the embodiments and simplifying the description, it does not indicate or imply that the device or element referred to must have a specific orientation, must be constructed and operated with a specific orientation, so that it cannot be understood as a limitation to the protection scope of the embodiments, and the same reference numerals indicate the same type of structure.

When a user uses a straw to take in liquid, one end of the straw is submerged into the liquid, the other end is extracted by the mouth to achieve the purpose of taking in the liquid. In the process of taking in the liquid with a straw, there is a possibility that the temperature of the liquid may be overly high and the user's mouth can be scalded.

In the process of using a straw to suck liquid, users roughly judge the temperature of the liquid to be extracted by feeling the temperature with hand, and if deemed suitable or safe, then start extracting the liquid for consumption. However, the liquid is contained in the container, and people determine whether the temperature is bearable by sensing the temperature of the liquid transferred by the container. Since the container may be made of heat-insulating material or material with poor thermal conductivity in order to avoid hand scald, the temperature perceived by hand is significantly different from the temperature of the liquid in the container. It is easy to cause scald of skin or tongue in the mouth when a user sips the liquid.

In order to avoid mouth scald caused by using a straw to sip liquids, various embodiments of the present disclosure provide a liquid extraction control method, which is applied to the process of sucking liquid through a straw, and to improve safety of the intraoral structure during the process of sucking liquid through a straw.

FIG. 1 is a schematic flowchart of a liquid extraction control method according to some embodiments. The liquid extraction control method as shown in FIG. 1 is implemented through assistance of a smart terminal, and includes steps S100 and S200. The liquid extraction control method of the embodiment will be described in detail below with reference to FIG. 1.

In step S100, a current temperature value of liquid is acquired in real time. In some embodiments, a liquid extraction control device shown in FIG. 5 can be adopted in combination with a straw for extraction the liquid, wherein a first acquiring component 1 can be submerged in the liquid to be sucked for temperature measurement, so as to acquire the real-time temperature of the liquid. As the temperature of the liquid changes, the temperature of the liquid acquired by the first acquiring component 1 changes accordingly, which facilities the accuracy of liquid temperature measurement.

In step S200, it is determined whether the current temperature value is within a predetermined temperature range, a liquid flow channel is opened when the current temperature value is within the predetermined temperature range, and the liquid flow channel is closed when the current temperature value is outside the predetermined temperature range.

The liquid extraction control device for implementing the liquid extraction control method of the embodiment stores a liquid temperature range of the liquid that is suitable or safe for people to consume. The temperature range can be an adjustable temperature range or a fixed temperature range, no limitation is made in the embodiment herein.

After acquiring the real-time temperature of the liquid, it is compared with the aforesaid stored temperature range to acquire a determination result. The opening and closing of the liquid flow channel can be controlled according to the determination result. Herein, the opening and closing of the liquid flow channel can be realized by controlling a liquid flow channel control component 4 in FIG. 5. The liquid flow channel control component 4 is mounted within the liquid flow channel 3. The liquid in the liquid flow channel 3 does not flow when the liquid flow channel control component 4 is turned off; and people can sip with the mouth to enable the liquid to enter the mouth through the liquid flow channel 3 when the liquid flow channel control component 7 is turned on.

When the determination result corresponds to the current temperature of the liquid outside the aforesaid temperature range, the liquid flow channel control component 4 is turned off according to the determination result, thereby preventing the liquid from entering the straw through the liquid flow channel 3 for people to suck, and avoiding scald or frostbite of the intraoral structure.

When the determination result corresponds to the current temperature of the liquid within the aforesaid temperature range, the liquid flow channel control component 4 is turned on according to the determination result, thereby allowing the liquid to enter the straw 8 through the liquid flow channel for people to suck. The temperature of the liquid extracted by people is appropriate, and there will be no scald or frostbite phenomenon of the intraoral structure.

In some embodiments, during the process of extracting liquid with a straw, it is decided whether the liquid can be extracted at the temperature by determining whether the current temperature of the liquid is within the stored temperature range. Only when the current temperature of the liquid is within the aforesaid temperature range, can a user sip the liquid, which makes effective improvement with respect to the danger that intraoral tissue structure may be scalded for consuming a hot drink, or feel too cold when consuming a cold drink, when the user attempts to sip the liquid without knowing the temperature of the liquid. As such, safety of using a straw to extract and consume liquid can be improved.

Figure 2:
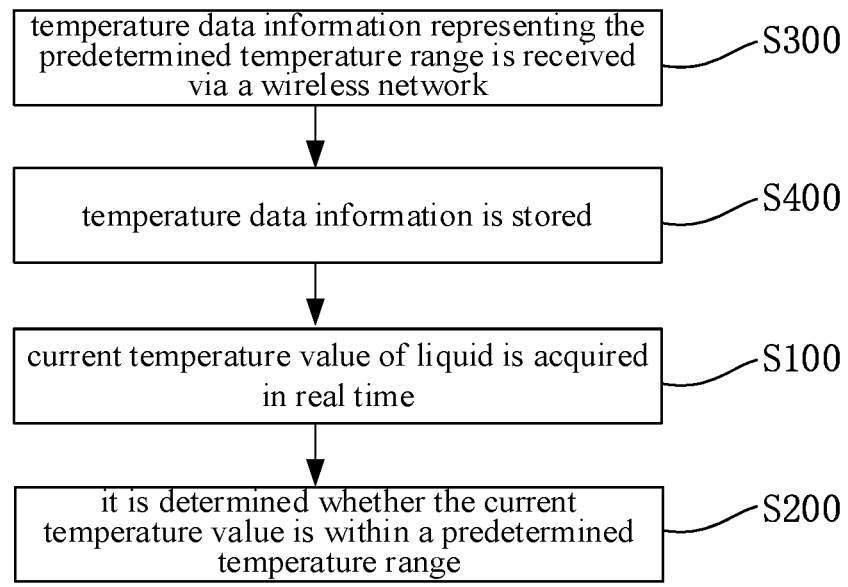
FIG. 2 is a schematic flowchart of another liquid extraction control method according to some embodiments.

FIG. 2 is a schematic flowchart of another liquid extraction control method according to some embodiments. Referring to FIG. 2, the liquid extraction control method of the embodiment further includes steps S300 and S400, wherein temperature data information representing the predetermined temperature range is received via a wireless network in step S300, before determining whether the current temperature value is within a predetermined temperature value range; and the temperature data information is stored in step S400.

Figure 6:
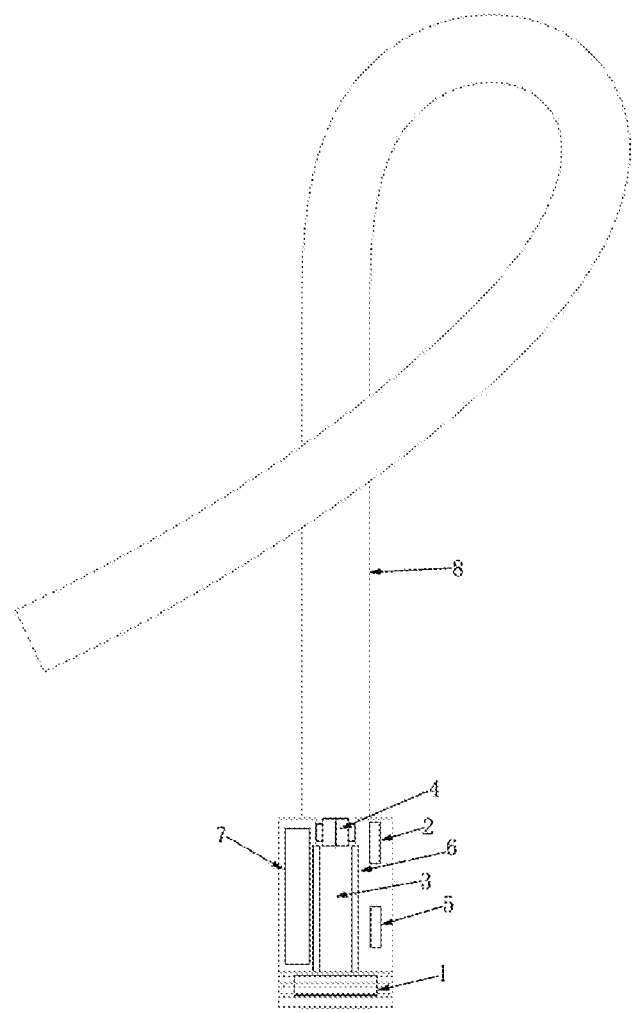
FIG. 6 is a schematic structural diagram of another liquid extraction control device according to some embodiments.

The liquid extraction control method of the embodiment can be implemented by a liquid extraction control device shown in FIG. 6. Herein, the liquid extraction control device includes a smart terminal, connected to a wireless communication component 5 via a wireless network. Before people use the liquid extraction control device for liquid extraction, they can set, on the smart terminal, a temperature range suitable for people to drink. The temperature data information is sent and stored by the wireless communication component 5. After the current temperature of the liquid is measured in real time, the current temperature is determined as compared with the temperature range in the temperature data information stored by the wireless communication component 5, and the liquid flow channel 3 is opened or closed based on the determination result.

Figure 3:
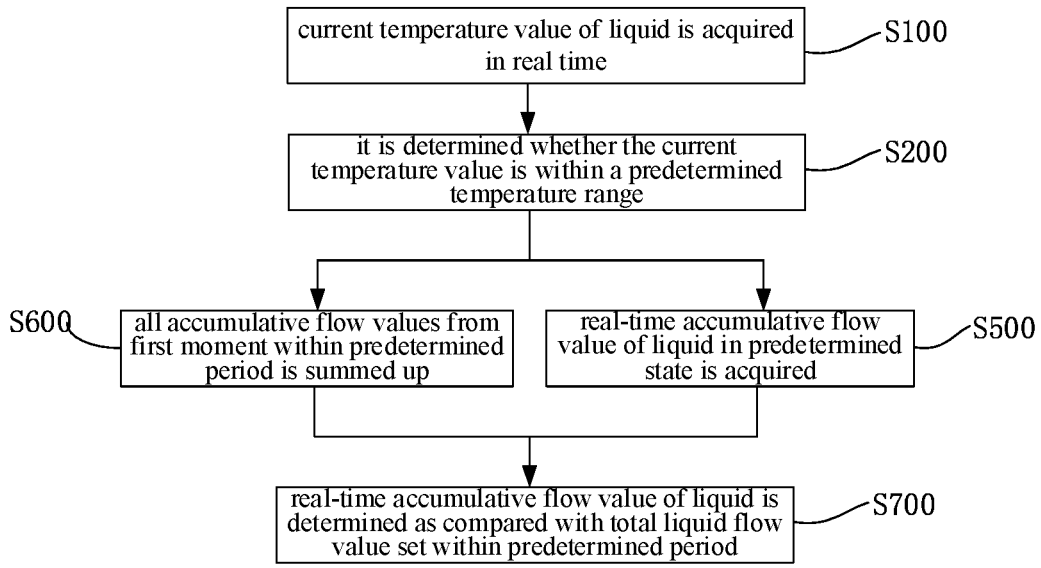
FIG. 3 is a schematic flowchart of still another liquid extraction control method according to some embodiments.

FIG. 3 is a schematic flowchart of still another liquid extraction control method according to some embodiments. Referring to FIG. 3, the liquid extraction control method of the embodiment further includes: in step S500, a real-time accumulative flow value of liquid in a predetermined state is acquired; in step S600, all the accumulative flow values from a first moment within a predetermined period is summed up to determine a real-time accumulative flow value of liquid; and in step S700, the real-time accumulative flow value of liquid is determined as compared with a total liquid flow value set within the predetermined period, wherein a start moment of the predetermined period is the first moment; the liquid flow channel is opened when the real-time accumulative flow value of liquid is less than the total liquid flow value; and the liquid flow channel is closed when the real-time accumulative flow value of liquid is greater than or equal to the total liquid flow value.

In some embodiments, the predetermined state is a movement state of liquid from a movement start to a movement end of the liquid along a predetermined direction of the liquid flow channel, that is, the entire process of one extraction is completed from the movement start to the movement end of the liquid that moves to the mouth. Herein, two extraction processes having a time gap difference within a negligible range are recorded as one extraction process. For example, during the sucking process, people may need to breath, which takes about several seconds. Then the previous sucking process before aeration and the next sucking process can be referred to as one sucking process.

Figure 5:
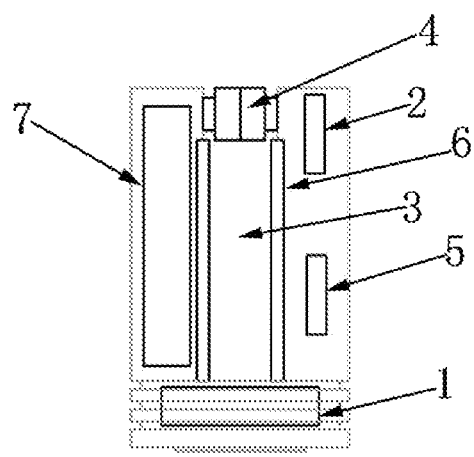
FIG. 5 is a schematic structural diagram of a liquid extraction control device according to some embodiments.

The accumulative flow values during all the extraction processes are summed, starting from the first moment in the predetermined period, and the obtained result is the real-time accumulative flow value in the predetermined period. For example, when making statistics of daily water intake of an infant, a liquid extraction control device as shown in FIG. 5 can be mounted in the straw of the infant water bottle. The guardian can wirelessly connect a liquid extraction assistance device through a smart terminal to monitor the accumulative flow value and real-time accumulative flow value of the infant's water intake. It is convenient for the guardian to timely replenish the infant with water according to the infant's water intake amount and prevent diseases. In other embodiments, it can also be used to monitor the extraction of traditional Chinese medicine decoction and the like for people with reduced mobility. Similarly, for the liquid that should be taken in with a limited quantity, such as carbonated beverage etc., the liquid flow channel is closed when the real-time accumulative flow value of the liquid is greater than or equal to the total liquid flow value.

The predetermined period in the above embodiment may be half a day, one day, one week etc., no specific limitation is made in the embodiment.

The liquid extraction control method of the embodiment can be used to assist the user in controlling the temperature and extraction amount of the liquid suitable for requirements of the special population, so as to achieve the purpose of smart quantitative extraction of liquid and precise monitoring.

Figure 4:
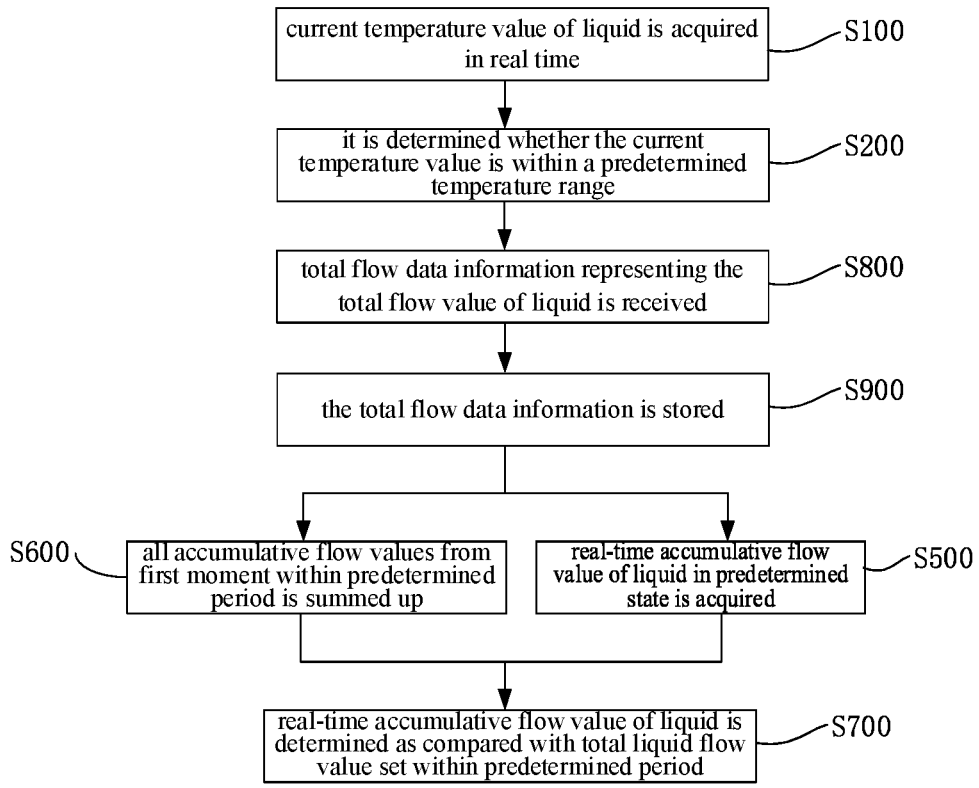
FIG. 4 is a schematic flowchart of yet another liquid extraction control method according to some embodiments.

FIG. 4 is a schematic flowchart of still another liquid extraction control method according to some embodiments. Referring to FIG. 4, the liquid extraction control method of the embodiment further includes steps S800 and S900, and the liquid extraction control method of the embodiment is described in detail below with reference to FIG. 4.

In step S800, total flow data information representing the total flow value of liquid is received; and in step S900, the total flow data information is stored. The liquid extraction control method in the embodiment may be implemented by a liquid extraction control device shown in FIG. 6. Herein, the liquid extraction control device includes a smart terminal, connected to the wireless communication component 5 via a wireless network. During the liquid extraction process using the liquid extraction control device, the total flow value of liquid that is suitable for people to drink in a predetermined period can be set on the smart terminal. The total flow data information is sent and stored by the wireless communication component 5. After the real-time accumulative liquid flow value of liquid is measured in real time, the real-time accumulative liquid flow value is determined as compared with the total liquid flow value in the total flow data information as stored by the wireless communication component 5, and the liquid flow channel 3 is opened or closed based on the determination result.

In some embodiments, the liquid extraction control method of the present disclosure can further include: sending the accumulative flow value, or the real-time accumulative flow value of liquid, or a combination of the accumulative flow value and the real-time accumulative flow value of liquid. In some embodiments, the accumulative flow value, or the real-time accumulative flow value of liquid, or a combination of the accumulative flow value and the real-time accumulative flow value of liquid, as acquired by the second acquiring component 6 can be sent to the smart terminal through the wireless communication component 5, which enables people to monitor the situation of liquid drinking in real time and achieve precise monitoring of liquid drinking.

In some embodiments, the liquid extraction control method of the present disclosure may further include: displaying the accumulative flow value, or the real-time accumulative flow value of liquid, or a combination of the accumulative flow value and the real-time accumulative flow value of liquid. The embodiment can be adjusted for different types of liquid. For example, the temperature of carbonated beverage to be extracted in summer can be lowered than that in winter, the temperature of sucking the liquid such as porridge or soup is higher than that of beverage. The same applies to the adjustment of the accumulative flow value and the real-time accumulative flow value of liquid.

The predetermined temperature value range, or the total liquid flow value, or a combination of the predetermined temperature value range and the total liquid flow value is adjusted on the smart terminal, and the aforesaid data is sent to the wireless communication component 5 via the wireless network, and the opening or closing of the liquid flow channel 3 is controlled by using the received data by the second acquiring component 6.

The smart terminal receives data such as the accumulative flow value of liquid extracted, the real-time accumulative fluid flow value of liquid, the current temperature of the liquid extracted, the time of sipping the liquid, etc. The smart terminal generates a database for the guardian or medical worker to view to help the guardian perform the monitoring behavior in a refined manner.

Based on the same inventive concept, the second aspect of the embodiment of the present disclosure further provides a liquid extraction control device, to make improvement with respect to the risk of hot burn or cold burn to the intraoral structure when the user sips too hot or too cold liquid with a straw.

FIG. 5 is a schematic structural diagram of a liquid extraction control device according to some embodiments. The liquid extraction control device shown in FIG. 5 includes a first acquiring component 1, a determining component 2, and a liquid flow channel control component 4.

The first acquiring component 1 is configured to acquire a current temperature of liquid in real time;

The determining component 2 is electrically coupled to the first acquiring component 1, and configured to determine whether the current temperature value is within a predetermined temperature value range; and the liquid flow channel control component 4 is electrically coupled to the determining component 2, and configured to open a liquid flow channel 3 when the current temperature value is within the predetermined temperature range and to close the liquid flow channel 3 when the current temperature value is outside the predetermined temperature range.

In some embodiments, the first acquiring component 1 can be a temperature sensor, the temperature of the liquid can be acquired after the first acquiring component 1 enters the liquid; the determining component 2 can be a micro data processing circuit that performs logical processing on the received data; and the liquid flow channel control component 4 can be a flow control valve, by ON/OFF of which the opening/closing of the liquid flow channel 3 is controlled.

The liquid extraction control device of the embodiment has a tubular structure, at the center position of which the liquid flow channel 3 is penetrated, and one end thereof is detachably connected to one end of the straw 8 shown in FIG. 6, which is used to control the current temperature of the liquid that is extracted with the straw 8 and the real time accumulative flow value of liquid that is extracted.

In the process of using the liquid extraction control device of the embodiment, the liquid extraction control device is connected to the straw 8, the first acquiring component 1 measures the current temperature of the liquid and thereafter sends it to the determining component 2. The determining component 2 is configured to determine the current temperature of the liquid as compared with a predetermined temperature range, and determine whether the current temperature value is within the predetermined temperature value range. When the current temperature value is within the predetermined temperature range, the liquid flow channel 3 is opened by controlling the liquid flow channel control component 4; and when the current temperature value is outside the predetermined temperature range, the liquid flow channel 3 is closed by controlling the flow channel control component 4.

FIG. 6 is a schematic structural diagram of another liquid extraction control device according to some embodiments, the liquid extraction control device shown in FIG. 6 includes a smart terminal and a wireless communication component 5, wherein the smart terminal is configured to send temperature data information representing the predetermined temperature range via a wireless network; the wireless communication component 5 is configured to receive and store the temperature data information representing the predetermined temperature range via a wireless network. The smart terminal and the wireless communication component 5 are connected through wireless communication, where the connection manner may be one of Wi-Fi connection, Bluetooth connection, infrared connection, and the like.

With continued reference to FIG. 6, the liquid extraction control device of the embodiment may further include a second acquiring component 6 electrically coupled to the determining component 2, and configured to acquire an accumulative flow value of liquid in a predetermined state, and to sum up all the accumulative flow values from a first moment within a predetermined period to determine a real-time accumulative flow value of liquid, wherein the predetermined state is a movement state of liquid from a movement start to a movement end of liquid along a predetermined direction of the liquid flow channel.

The determining component 2 is further configured to determine the real-time accumulative flow value of liquid as compared with a total liquid flow value that is set within the predetermined period, in which a start moment of the predetermined period is the first moment.

The liquid flow channel control component 4 is further configured to open the liquid flow channel when the real-time accumulative flow value of liquid is less than the total liquid flow value, and to close the liquid flow channel when the real-time accumulative flow value of liquid is greater than or equal to the total liquid flow value.

Figure 7:
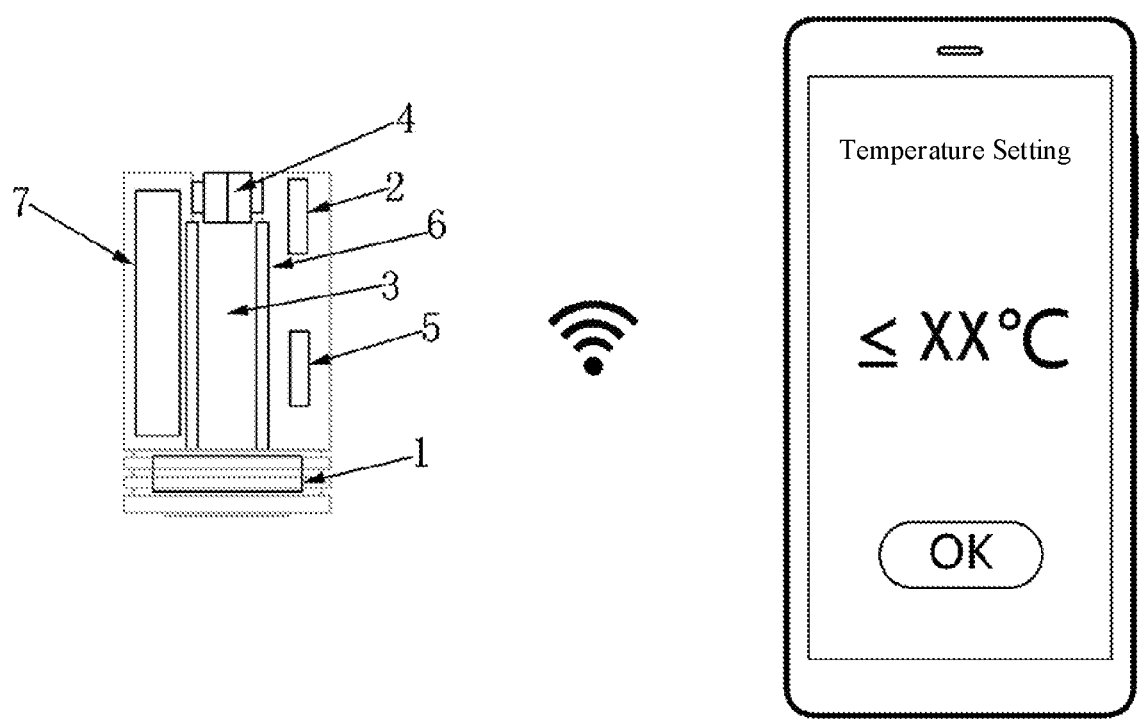
FIG. 7 is a schematic structural diagram of still another liquid extraction control device according to some embodiments.
Figure 8:
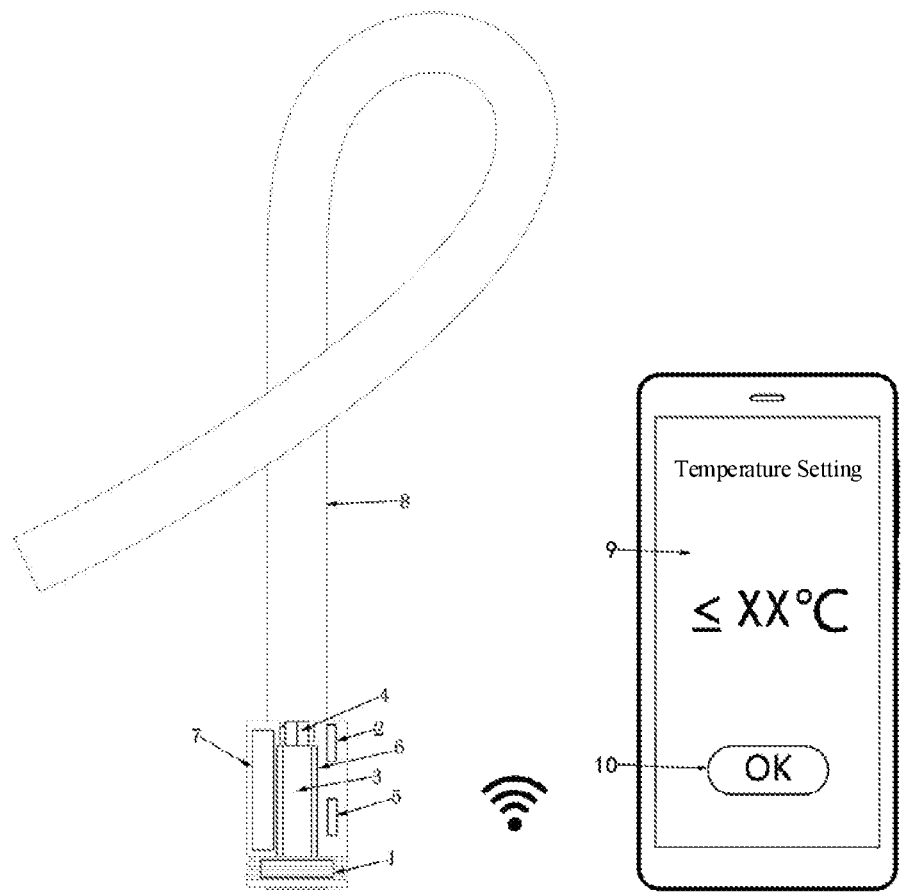
FIG. 8 is a schematic structural diagram of yet another liquid extraction control device according to some embodiments.

FIG. 7 is a schematic structural diagram of still another liquid extraction control device according to some embodiments, and FIG. 8 is a schematic structural diagram of yet another liquid extraction control device according to some embodiments. Referring to FIGS. 5 to 8, the wireless communication component 5 is further configured to: receive and store total flow data information representing the total flow value of liquid; send the accumulative flow value, or the real-time accumulative flow value of liquid, or a combination of the accumulative flow value and the real-time accumulative flow value of liquid.

In some embodiments, the liquid extraction control device of the present disclosure further includes a straw 8 and a power source 7, wherein the straw 8 is connected to one end of the liquid flow channel 3 that is close to the liquid flow channel control component 4. The power source 7 is connected to the first acquiring component 1, the determining component 2, the liquid flow channel control component 4, the wireless communication component 5, and the second acquiring component 6 respectively, for power supply, so as to ensure that the liquid extraction control device of the embodiment can operate normally.

With continued reference to FIGS. 7 and 8, the liquid extraction control device further includes a displaying component 9 and an adjusting component 10, wherein the displaying component 9 is connected to the wireless communication component 5 via a wireless network, and configured to display the accumulative flow value, or the real-time accumulative flow value of liquid, or a combination of the accumulative flow value and the real-time accumulative flow value of liquid; and the adjusting component 10 is connected to the wireless communication component 5 via a wireless network, electrically coupled to the display component 9, and configured to adjust the predetermined temperature range, or the total flow value of liquid, or a combination of the predetermined temperature range and the total flow value of liquid.

A third aspect of the embodiments of the present disclosure provides a liquid extraction control device, which is used to solve the defect of mouth injure due to the influence of temperature during the process of extracting liquid by using a straw in the related technologies.

Figure 9:
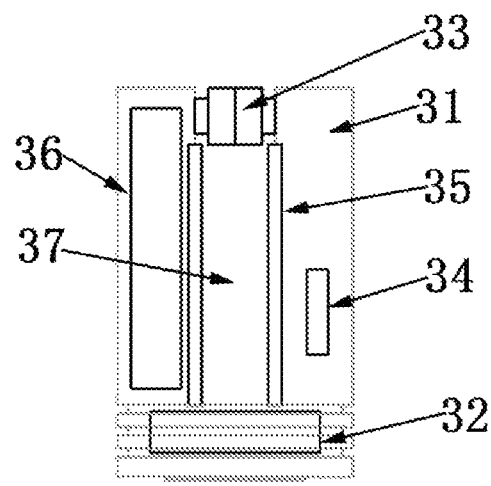
FIG. 9 is a schematic structural diagram of yet another liquid extraction control device according to some embodiments.
Figure 10:
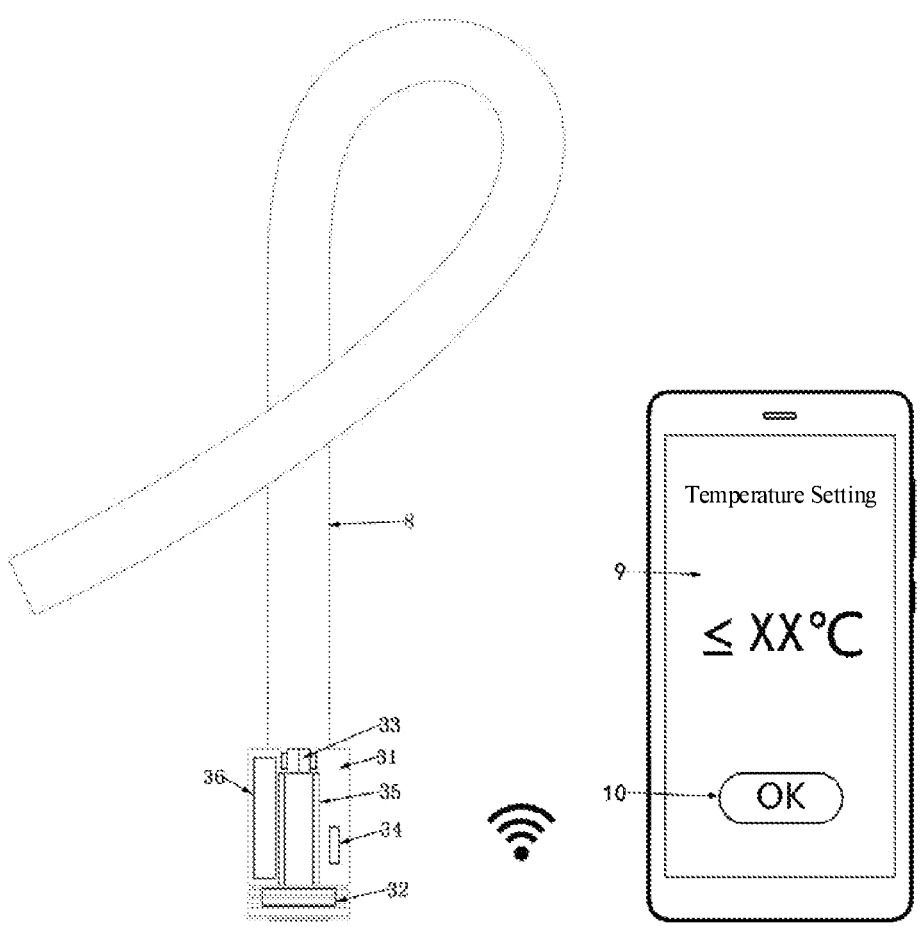
FIG. 10 is a schematic structural diagram of yet another liquid extraction control device according to some embodiments.

FIG. 9 is a schematic structural diagram of yet another liquid extraction control device according to some embodiments. FIG. 10 is a schematic structural diagram of yet another liquid extraction control device according to some embodiments. As shown in FIGS. 9 and 10, the liquid extraction control device of the embodiment can include a housing 31, a temperature sensor 32, a flow control valve 33, and a processor. The housing 31 can include a liquid flow channel 37 as well as a first end and a second end that are connected through the liquid flow channel 37, wherein the first end is connected to a straw; the temperature sensor 32 is mounted at the second end, and measures a temperature of liquid that passes through the liquid flow channel 37; the flow control valve 33 is disposed within the liquid flow channel 37, and is electrically coupled to the temperature sensor 32; and the processor is electrically coupled to the temperature sensor 32 and the flow control valve 33, and configured to control opening and closing of the flow control valve 33 based on the temperature measured by the temperature sensor 32.

The liquid extraction control device provided in the embodiment can be detachably connected to the straw 8, for example, thread is provided on an outer side of the second end of the housing 31, and the end of the straw 8 that is connected to the second end is also provided with thread. Before the liquid extraction control device of the embodiment is used, the liquid extraction control device of the embodiment can be mounted on one end of the straw 8 through screwing match; and after the ingestion of the fluid food is completed, the liquid extraction control device of the embodiment can be removed from the straw 8 for secondary use. By detachably connecting the liquid extraction control device of the embodiment with the straw 8, a utilization ratio of the liquid extraction control device of the embodiment can be improved, and the liquid extraction cost can be reduced.

The liquid extraction control device provided in the embodiment can also be integrally formed with the straw 8. After assembling the liquid extraction control device of the embodiment with the straw 8, the liquid extraction control device of the embodiment and the straw 8 can be made into an integrated structure by a molding process. Effective improvement can be made with respect to the problem of inaccuracy of the acquired ingestion data due to a gap with the straw 8 during the use of the liquid extraction control device of the embodiment. The safety and accuracy of extraction-for-ingestion is raised.

In some embodiments, a processor can be provided to process the temperature data of the liquid to be extracted as measured by the temperature sensor 32, and opening and closing actions of the flow control valve 33 can be controlled based on a comparison result between the temperature data of the liquid to be extracted and the temperature data information stored in the processor. If the temperature data of the liquid to be extracted matches the temperature data information stored in the processor, the flow control valve 33 is opened to allow the liquid to be extracted to enter the straw 8 through the flow control valve 33 for the user to take in; if the temperature represented by the temperature data of the liquid to be extracted is outside the temperature range represented by the temperature data information stored in the processor, the flow control valve 33 is closed, and the liquid to be extracted is prohibited from entering the straw 8 through the flow control valve 33.

The processor in the embodiment can be a PCB circuit board embedded inside the housing 31. By embedding the processor inside the housing 31, the threat of short circuit caused by the liquid to be extracted on the processor and the structural damage caused by collision can be reduced.

In the process of sucking liquid food using the liquid extraction control device of the embodiment, at least the first end thereof is immersed in the liquid, so that the temperature sensor 32 can contact the liquid to be extracted, so as to acquire the temperature of the liquid to be extracted. The temperature sensor 32 is electrically coupled to the flow control valve 33 through a processor. When the temperature of the liquid to be extracted as acquired by the temperature sensor 32 is within a predetermined temperature range, the processor opens the flow control valve 33 after data processing; and when the temperature of the liquid to be extracted as acquired by the temperature sensor 32 is outside the predetermined temperature range, the processor closes the flow control valve 33 after data processing. In some embodiments, opening and closing of the flow control valve 33 is controlled through the temperature of the liquid to be extracted, which can prevent the user from taking in the liquid that is too cold or too hot outside the predetermined temperature range, and provide effective guarantee for the safety of food ingestion in the mouth.

In some embodiments, the liquid extraction control device can further include a flow meter 35, which is disposed within the liquid flow channel 37, is electrically coupled to the processor, and measures a total amount of liquid flowing through the liquid flow channel 37 within a predetermined time range or in a predetermined state; and the processor controls opening and closing of the flow control valve based on the total amount of the liquid measured by the flow meter. In some embodiments, the flow meter 35 can be a tubular structure that matches a shape of the liquid flow channel 37, or a ring structure that is mounted within the liquid flow channel 37 and matches an inner diameter of the liquid flow channel 37. The flow meter 35 of the embodiment can be integrally formed with the housing 31, or can be embedded inside the housing 31 in a detachable form.

In some embodiments, the liquid extraction control device of the present disclosure can further include a wireless communication module 34 disposed on the housing 31, electrically coupled to the processor, and wirelessly connected to a smart terminal; and the processor receives a control instruction of the smart terminal through the wireless communication module 34. In some embodiments, the control instruction can include opening the flow control valve 33 and closing the flow control valve 33, wherein the liquid to be extracted can enter the straw 8 through the liquid flow channel 37 after the flow control valve 33 is opened; and the liquid to be extracted is prohibited from entering the straw 8 after the flow control valve 33 is closed.

In some embodiments, the liquid extraction control device of the embodiment can be communicatively connected to the smart terminal via the wireless communication module 34. Herein, the wireless communication module 34 can be a Bluetooth or a wireless network. The specific form of wireless communication is not limited in the embodiment.

In some embodiments, a display screen can be further provided on the housing 31, the display screen is electrically coupled to the processor, and displays at least one of opening/closing states of the flow control valve 33, and temperature data of the liquid to be extracted. By setting a display screen on the liquid extraction control device, the user can watch the opening/closing state of the flow control valve 33 during the liquid extraction process using the liquid extraction control device of the embodiment. It is avoided that the user makes a wrong judgment on whether the liquid extraction control device of the embodiment is faulty when the user finds that the extraction action cannot be implemented during the liquid extraction process using the liquid extraction control device of the embodiment. For example, when there is no display screen to display the opening/closing state of the flow control valve 33, if the extraction or sucking action cannot be implemented, the user may judge and conclude that the liquid flow channel 37 is blocked or the flow control valve 33 is faulty, thereby performing the disassembly of the liquid extraction control device for inspection. After the display screen is set to display the opening/closing state of the flow control valve 33, the above-mentioned misjudgment by the user can be avoided, and the disadvantage of disoperation on the liquid extraction control device of the embodiment can be avoided.

The data of the liquid extracted by using liquid extraction control device of the embodiment can be sent to the smart terminal through the wireless communication module 34;

and also, a control instruction sent by the smart terminal can be received to adjust the temperature data information of the liquid to be extracted. The smart terminal in the embodiment can be a mobile phone, a tablet computer, a smart watch, or the like. The smart terminal can be provided with a display screen 9, and a virtual button 10 disposed on the display screen 9 to adjust temperature data information of the liquid to be extracted.

In some embodiments, the temperature range of the liquid to be extracted, the flow value of the liquid to be extracted each time when taking in, and the total amount of liquid to be extracted which is taken in within a predetermined time range can be adjusted through the virtual button 10 on the smart terminal. For example, the temperature range of the liquid to be extracted can be set to 60 degrees Celsius or less, or 30 degrees Celsius to 60 degrees Celsius by the virtual button 10. By setting the temperature range of the liquid to be extracted, it is possible to prevent the user's mouth from being damaged by too low or too high temperature, and raise the safety of liquid to be extracted.

The flow value of the liquid to be extracted each time when taking in can also be set by the virtual button 10. The flow value of the liquid to be extracted each time when taking in can be acquired based on the state of the liquid flowing through the liquid flow channel 37. For example, the flow value under the state of uninterrupted flow of the liquid to be extracted, that is, the flow value between two adjacent pauses during the user's ingestion of the liquid to be extracted. The pause during the user's ingestion of the liquid to be extracted can be the user's swallowing process. In some embodiments, by setting the flow value of the liquid to be extracted each time when taking in and then controlling opening/closing of the flow control valve 33, the phenomenon that the user sucks the liquid too much and is choked by the liquid can be avoided. For example, the flow value of the liquid to be extracted each time when taking in can be set to be within 50 ml, the flow control valve 33 will be closed when 50 ml is exceeded and opened automatically after two seconds.

The total amount of liquid to be extracted which is taken in within a predetermined time range can also be set by the virtual button 10. The total amount of liquid to be extracted by the user within a predetermined time range is controlled. For example, for users who take in alcohol in a limited amount, by setting the total amount of alcohol taken in per day, the user can avoid physical harm caused by excessive ingestion of alcohol per day. By setting the total amount of liquid to be extracted which is taken in within a predetermined time range, the user can reduce the harm to the body caused by excessive ingestion.

In some embodiments, the liquid extraction control device of the present disclosure can further include a battery 36 which is mounted on the housing 31, and is electrically coupled to the temperature sensor 32, the processor, the flow control valve 33, and the wireless communication module 34 to supply power, so as to ensure that the temperature sensor 32, the flow control valve 33, the processor, and the wireless communication module 34 can operate normally.

The liquid extraction control device provided by the embodiments of the present disclosure can control the temperature range of the liquid to be extracted by setting a suitable temperature range for the liquid to be extracted, and effectively improve the disadvantage of mouth scald caused by overheating of the liquid extracted by people through a straw. The total extraction amount of liquid within a predetermined period can be learned through flow statistics; and the total flow value of liquid within the predetermined period can be controlled to avoid excessive liquid extraction, which assists people to control the temperature and the extraction amount suitable for the requirements for sipping liquids by specific populations, such as special-needs users including users with reduced mobilities, infants, etc., so as to achieve the effect of smart quantitative liquid extraction.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath," or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A liquid extraction control device with a tubular structure, comprising:
   a temperature sensor configured to acquire a current temperature of liquid in real time;
   a determining circuit electrically coupled to the temperature sensor, and configured to determine whether the current temperature value is within a predetermined temperature value range;
   a liquid flow channel control component electrically coupled to the determining circuit, and configured to open a liquid flow channel when the current temperature value is within the predetermined temperature range and to close the liquid flow channel when the current temperature value is outside the predetermined temperature range;
   an acquiring circuit electrically coupled to the determining circuit, and configured to acquire an accumulative flow value of the liquid in a predetermined state, and to sum up all the accumulative flow values from a first moment within a predetermined period to determine a real-time accumulative flow value of the liquid, wherein the predetermined state is a movement state of the liquid from a start of movement to an end of movement of the liquid along a predetermined direction of the liquid flow channel;
   the determining circuit being further configured to compare the real-time accumulative flow value of the liquid with a total liquid flow value that is set within the predetermined period, wherein a start moment of the predetermined period is the first moment; and
   the liquid flow channel control component being further configured to open the liquid flow channel when the real-time accumulative flow value of the liquid is less than the total liquid flow value and to close the liquid flow channel when the real-time accumulative flow value of the liquid is greater than or equal to the total liquid flow value.

2. The liquid extraction control device according to claim 1, further comprising:
   a smart terminal configured to send temperature data information representing the predetermined temperature range via a wireless network; and
   a wireless communication component configured to receive and store the temperature data information representing the predetermined temperature range via a wireless network.

3. The liquid extraction control device according to claim 1, wherein the wireless communication component is further configured to receive and store total flow data information representing the total flow value of the liquid.

4. The liquid extraction control device according to claim 3, wherein the wireless communication component is further configured to send any one of the accumulative flow value, the real-time accumulative flow value of the liquid, and a combination of the accumulative flow value and the real-time accumulative flow value of the liquid.

5. The liquid extraction control device according to claim 1, further comprising:
   a displaying component connected to the wireless communication component via a wireless network, and configured to display any one of the accumulative flow value, the real-time accumulative flow value of the liquid, and a combination of the accumulative flow value and the real-time accumulative flow value of the liquid.

6. The liquid extraction control device according to claim 5, further comprising:
   a straw connected to one end of the liquid flow channel that is close to the liquid flow channel control component.

7. A liquid extraction control device with a tubular structure, comprising:
   a housing including a liquid flow channel, a first end and a second end connected through the liquid flow channel, wherein the first end is connected to a straw;
   a temperature sensor mounted at the second end, and configured to measure a temperature of liquid passing through the liquid flow channel;
   a flow control valve disposed within the liquid flow channel; and
   a processor electrically coupled to the temperature sensor and the flow control valve, and configured to control opening and closing of the flow control valve based on the temperature measured by the temperature sensor, wherein the processor is further configured to:

acquire an accumulative flow value of the liquid in a predetermined state, and sum up all the accumulative flow values from a first moment within a predetermined period to determine a real-time accumulative flow value of the liquid, wherein the predetermined state is a movement state of the liquid from a start of movement to an end of movement of the liquid along a predetermined direction of the liquid flow channel;

compare the real-time accumulative flow value of the liquid with a total liquid flow value that is set within the predetermined period, wherein a start moment of the predetermined period is the first moment; and open the liquid flow channel when the real-time accumulative flow value of the liquid is less than the total liquid flow value and close the liquid flow channel when the real-time accumulative flow value of the liquid is greater than or equal to the total liquid flow value.

8. The liquid extraction control device according to claim 7, further comprising:

a flow meter disposed within the liquid flow channel, electrically coupled to the processor, and configured to measure a total amount of the liquid flowing through the liquid flow channel within a predetermined time range or in a predetermined state; and the processor being configured to control the opening and closing of the flow control valve based on the total amount of liquid measured by the flow meter.

9. The liquid extraction control device according to claim 7, further comprising:

a wireless communication module disposed on the housing, electrically coupled to the processor, and being in wireless communication with a smart terminal; and the processor being configure to receive a control instruction of the smart terminal through the wireless communication module.

10. The liquid extraction control device according to claim 7, further comprising a display screen electrically coupled to the processor to display an opening and closing state of the flow control valve.

11. The liquid extraction control device according to claim 7, further comprising:

a battery mounted on the housing, and electrically coupled to the temperature sensor, the flow control valve, and the processor.

12. The liquid extraction control device according to claim 8, further comprising:

a wireless communication module disposed on the housing, electrically coupled to the processor, and being in wireless communication with a smart terminal; and the processor being configure to receive a control instruction of the smart terminal through the wireless communication module.

13. A liquid extraction system with a tubular structure, comprising:

a housing including the liquid flow channel, and a first end and a second end connected through the liquid flow channel, wherein the first end is connected to a straw;

a temperature sensor mounted at the second end, and configured to measure a temperature of liquid passing through the liquid flow channel;

a flow control valve disposed within the liquid flow channel;

a processor electrically coupled to the temperature sensor and the flow control valve, and configured to control opening and closing of the flow control valve based on the temperature measured by the temperature sensor, acquire an accumulative flow value of the liquid in a predetermined state, and sum up all the accumulative flow values from a first moment within a predetermined period to determine a real-time accumulative flow value of the liquid, wherein the predetermined state is a movement state of the liquid from a start of movement to an end of movement of the liquid along a predetermined direction of the liquid flow channel; compare the real-time accumulative flow value of the liquid with a total liquid flow value that is set within the predetermined period, wherein a start moment of the predetermined period is the first moment; and open the liquid flow channel when the real-time accumulative flow value of the liquid is less than the total liquid flow value and close the liquid flow channel when the real-time accumulative flow value of the liquid is greater than or equal to the total liquid flow value; and a display screen electrically coupled to the processor to display an opening and closing state of the flow control valve;

wherein the system is configured for specific populations, and the processor is further configured to:

control the temperature range of the liquid to be extracted by setting a suitable temperature range for the liquid to be extracted to thereby prevent injuries caused by overly hot or overly cold liquid;

determine a total extraction amount of liquid within a predetermined period through flow statistics of the liquid; and control the total extraction amount of liquid within the predetermined period to avoid excessive liquid extraction, thereby achieving smart quantitative liquid extraction.

* * * * *